US008642504B2

(12) United States Patent
Campbell et al.

(10) Patent No.: US 8,642,504 B2
(45) Date of Patent: Feb. 4, 2014

(54) AQUEOUS AND TRANSPARENT COATINGS FOR MARKING SUBSTRATES

(75) Inventors: Jonathan Campbell, Riehen (CH); William Walker, Manchester (GB); Alan Platt, Manchester (GB); John Whitworth, Manchester (GB); Karen O'Donoghue, Epping (GB); Ann Hunt, Stockport (GB); Howard Roger Dungworth, Huddersfield (GB); John Mark Plonka, Leeds (GB)

(73) Assignee: Gill Jennings & Every LLP, London (GB)

( * ) Notice: Subject to any disclaimer, the term of this patent is extended or adjusted under 35 U.S.C. 154(b) by 940 days.

(21) Appl. No.: 11/989,167

(22) PCT Filed: Jul. 17, 2006

(86) PCT No.: PCT/EP2006/064299
§ 371 (c)(1),
(2), (4) Date: May 6, 2009

(87) PCT Pub. No.: WO2007/012578
PCT Pub. Date: Feb. 1, 2007

(65) Prior Publication Data
US 2009/0214835 A1      Aug. 27, 2009

(30) Foreign Application Priority Data
Jul. 25, 2005   (EP) ..................................... 05106789

(51) Int. Cl.
*B41M 5/24*      (2006.01)
(52) U.S. Cl.
USPC ........... 503/201; 503/202; 503/210; 503/211; 503/213; 428/195.1; 428/913; 430/200; 430/964; 106/31.14
(58) Field of Classification Search
USPC ............. 428/195.1, 913; 106/31.14; 430/200, 430/964; 503/201, 202, 210, 211, 213
See application file for complete search history.

(56) References Cited

U.S. PATENT DOCUMENTS

| | | | |
|---|---|---|---|
| 2,357,725 A | | 9/1944 | Bennett |
| 2,427,443 A | * | 9/1947 | Cochran ....................... 430/346 |
| 2,800,457 A | | 7/1957 | Green et al. |
| 3,373,170 A | | 3/1968 | Jones |
| 3,513,114 A | | 5/1970 | Hahn et al. |
| 3,778,383 A | | 12/1973 | Schibler et al. |
| 3,853,791 A | * | 12/1974 | Feins ........................... 502/314 |
| 3,955,987 A | | 5/1976 | Schaar et al. |
| 4,166,811 A | | 9/1979 | Marr et al. |
| 4,237,212 A | | 12/1980 | Inoue et al. .................... 430/346 |
| 4,916,247 A | | 4/1990 | Steinmann et al. |
| 5,063,137 A | | 11/1991 | Kiyonari et al. |
| 5,256,805 A | | 10/1993 | O'Lenick et al. |
| 5,358,821 A | | 10/1994 | Bertrand et al. |
| 5,413,629 A | | 5/1995 | Yasui et al. |
| 5,810,915 A | * | 9/1998 | Nagai et al. ................. 106/31.43 |
| 6,143,904 A | | 11/2000 | Zink et al. |
| 6,210,472 B1 | | 4/2001 | Kwan et al. |
| 6,261,348 B1 | * | 7/2001 | Kwan et al. ................. 106/31.14 |
| 6,394,594 B1 | | 5/2002 | Katsuragi et al. |
| 6,425,947 B1 | | 7/2002 | Berlin et al. |
| 6,478,861 B1 | * | 11/2002 | Kwan et al. ................. 106/31.14 |
| 7,270,919 B2 | | 9/2007 | Stubbs ........................... 430/17 |
| 2001/0044553 A1 | | 11/2001 | Kabashima et al. |
| 2003/0180660 A1 | * | 9/2003 | Khan .......................... 430/270.1 |
| 2003/0186001 A1 | | 10/2003 | Khan ............................. 427/596 |
| 2003/0191223 A1 | | 10/2003 | Waterkamp et al. |
| 2004/0110870 A1 | | 6/2004 | Liu |
| 2004/0157975 A1 | | 8/2004 | Kniess et al. |
| 2005/0158548 A1 | | 7/2005 | Senga |
| 2006/0040217 A1 | | 2/2006 | Stubbs |
| 2007/0128542 A1 | | 6/2007 | Watanabe et al. |
| 2008/0113861 A1 | | 5/2008 | Watanabe et al. |
| 2009/0071367 A1 | | 3/2009 | Campbell et al. |
| 2010/0233447 A1 | | 9/2010 | Campbell et al. |
| 2010/0239642 A1 | | 9/2010 | Campbell et al. |
| 2011/0148092 A1 | * | 6/2011 | Jarvis et al. ..................... 283/67 |
| 2011/0274893 A1 | | 11/2011 | Kaser et al. |
| 2012/0129090 A1 | | 5/2012 | Mamak |

FOREIGN PATENT DOCUMENTS

| | | |
|---|---|---|
| EP | 600441 | 6/1994 |
| EP | 0796742 | 9/1997 |
| EP | 0812888 | 12/1997 |
| EP | 0980028 | 2/2000 |
| EP | 1676890 | 7/2006 |
| EP | 1847635 | 10/2007 |
| EP | 1859674 | 11/2007 |

(Continued)

OTHER PUBLICATIONS

"Dilute Ammonium Hydroxide" acquired from http://www51. honeywell.com/sm/em/common/documents/2.6_usa_msds_81. pdf on Nov. 28, 2011.*

(Continued)

Primary Examiner — Gerard Higgins
(74) Attorney, Agent, or Firm — Stoel Rives LLP; Samuel E. Webb; Yury M. Colton

(57)  ABSTRACT

The present invention provides a composition, which comprises an aqueous solvent and forms a transparent colorless coating, which yields markings of high contrast on exposure to energy. It also provides a process for the preparation of these compositions, substrates coated with these compositions and a process for their preparation, a process for preparing marked substrates using these compositions and marked substrates obtainable by the latter process.

17 Claims, No Drawings

(56) References Cited

FOREIGN PATENT DOCUMENTS

| | | |
|---|---|---|
| GB | 989264 | 4/1965 |
| GB | 1355124 | 6/1974 |
| GB | 2206419 | 1/1989 |
| JP | 03-76873 | 3/1991 |
| JP | 11-67604 | 11/1999 |
| WO | 02/074548 | 9/2002 |
| WO | WO 2004043704 A1 * | 5/2004 |
| WO | 2005/012442 | 2/2005 |
| WO | WO-2006/063165 | 6/2006 |
| WO | WO-2006/064193 | 6/2006 |
| WO | WO-2006/108745 | 10/2006 |
| WO | WO-2007/012578 | 2/2007 |
| WO | WO-2007/031454 | 3/2007 |
| WO | WO-2008/083912 | 7/2008 |
| WO | WO-2009/010393 | 1/2009 |
| WO | WO-2009/010405 | 1/2009 |
| WO | WO-2010/046285 | 4/2010 |
| WO | WO-2010/049282 | 5/2010 |

OTHER PUBLICATIONS

"Texicryl 13-567" acquired from http://www.scottbader.com/downloads/UK_PDF_Datasheet_Files/Graphic_Arts/13-567.pdf on Nov. 28, 2011.*
Specification sheet for Texicryl S-02 acquired from http://www.scottbader.com/downloads/UK_PDF_Datasheet_Files/Graphic_Arts/Texicryl%20S-02.pdf on Nov. 2, 2012.*
Preliminary Amendment filed Sep. 11, 2007 in related U.S. Appl. No. 11/886,137.
First Office Action issued May 9, 2011 in related U.S. Appl. No. 11/886,137.
Response to the May 9, 2011 Office Action issued Aug. 3, 2011 in related U.S. Appl. No. 11/886,137.
Notice of Allowance issued Sep. 30, 2011 in related U.S. Appl. No. 11/886,137.
International Search Report and Written Opinion issued May 29, 2006 in International Application No. PCT/EP2006/060658.
International Preliminary Report on Patentability issued Sep. 25, 2007 in International Application No. PCT/EP2006/060658.
DERWENT AN 1999-238901[20] of JP 11-67604.
DERWENT AN 1990-241627[32] of JP 03-76873.
International Search Report and Written Opinion issued Oct. 30, 2006 in International Application No. PCT/EP2006/064299.
International Preliminary Report on Patentability issued Nov. 27, 2008 in International Application No. PCT/EP2006/064299.
Preliminary Amendment filed Jan. 12, 201 in related U.S. Appl. No. 12/668,666.
First Office Action issued Dec. 11, 2012 in related U.S. Appl. No. 12/668,666.
Response to the Dec. 11, 2012 Office Action filed Jun. 11, 2013 in related U.S. Appl. No. 12/668,666.
International Search Report and Written Opinion issued Sep. 11, 2008 in International Application No. PCT/EP2008/058547.
International Preliminary Report on Patentability issued Jan. 19, 2010 in International Application No. PCT/EP2008/058547.
Preliminary Amendment filed Jan. 12, 2010 in related U.S. Appl. No. 12/668,669.
First Office Action issued Jul. 11, 2012 in related U.S. Appl. No. 12/668,669.
Response to the Jul. 11, 2012 Office Action filed Oct. 16, 2012 in related U.S. Appl. No. 12/668,669.
Second Office Action issued Jan. 18, 2013 in related U.S. Appl. No. 12/668,669.
Response to the Jan. 18, 2013 Office Action filed Jul. 9, 2013 in related U.S. Appl. No. 12/668,669.
International Search Report and Written Opinion issued Oct. 28, 2008 in International Application No. PCT/EP2008/058637.
International Preliminary Report on Patentability issued Jan. 19, 2010 in International Application No. PCT/EP2008/058637.
Preliminary Amendment filed Apr. 11, 2011 in related U.S. Appl. No. 13/123,603.
International Search Report and Written Opinion issued Jan. 25, 2010 in International Application No. PCT/EP2009/063521.
International Preliminary Report on Patentability issued May 3, 2011 in International Application No. PCT/EP2009/063521.
Preliminary Amendment filed Apr. 5, 2011 in related U.S. Appl. No. 13/122,563.
International Search Report and Written Opinion issued May 11, 2010 in International Application No. PCT/EP2009/063377.
International Preliminary Report on Patentability issued Apr. 26, 2011 in International Application No. PCT/EP2009/063377.

* cited by examiner

AQUEOUS AND TRANSPARENT COATINGS FOR MARKING SUBSTRATES

The present invention refers to a coating composition for marking substrates, to a process for the preparation of these compositions, to substrates coated with these compositions and to a process for their preparation, to a process for preparing marked substrates using these compositions and marked substrates obtainable by the latter process.

Packaging usually needs to be marked with information such as logos, bar codes, expiry dates or batch numbers. One way to achieve this is by coating the packaging with a composition, which upon treatment with energy such as heat forms a visible marking. When using laser irradiation as energy, the marking can be even so small that it is invisible or nearly invisible to the human eye.

WO 02/068205 describes a method for marking an object, wherein the object comprises or is coated with a formulation comprising a material having functional groups such as polyhydroxy compounds, and a metal compound such as alkali metal, alkaline earth metal, iron oxides or salts and organometallics. The two components react on irradiation with a laser to form a product of contrasting colour.

The aqueous compositions of WO 02/068205 have the disadvantage that they only provide yellow or grey/green markings, but no black markings. Black markings are only obtained using organic solvent-based systems. In addition, the described compositions are not suitable for coating paper or plastics.

WO 02/074548 describes coating compositions comprising an oxyanion of a multivalent metal such as molybdate or tungstate, a binder and water or an organic solvent. These compositions were coated on a substrate, for example cartonboard, dried to yield an opaque coating and exposed to IR laser irradiation to produce a black marking.

The disadvantage of the coating compositions of WO 02/074548 is that only opaque coatings can be obtained.

WO 2004/043704 describes coating compositions comprising a colour former, an amine molybdate, tungstate or vanadate, water or an organic solvent and optionally a polymeric binder. The organic solvent-based systems can give a transparent coating whereas the aqueous-based systems only give opaque coatings. The compositions were coated on substrates such as polyethylene terephthalate film, aluminium foil or polypropylene packaging film, dried and exposed to an IR laser or thermal printer to produce a coloured marking.

WO 2005/012442 describes coating compositions comprising a pigment, water or an organic solvent, a conductive polymer and optionally a binder. The pigment can be an oxyanion of molybdate or tungstate.

The disadvantage of the aqueous coating compositions of WO 2004/043704 and WO 2005/012442 is that only opaque coatings can be obtained.

It is an object of the present invention to provide aqueous coating compositions, which form transparent colourless coatings and yield markings of high contrast on exposure to energy.

The composition of the present invention comprises an oxygen-containing transition metal compound and an aqueous solvent and forms transparent colourless coatings, which yield markings of high contrast on exposure to energy.

Preferably, the markings are black.

The oxygen-containing transition metal compound is preferably selected from the group consisting of oxygen-containing chromium, molybdenum and tungsten compounds.

Examples of oxygen-containing chromium, molybdenum and tungsten compounds are chromium, molybdenum and tungsten oxides, alkali metal, earth alkaline metal, ammonium and mono-, di-, tri- and tetra-$C_{1-8}$-alkylammonium mono-, di- and polychromates, -molbydates and -tungstates, alkali metal, earth alkaline metal, ammonium and mono-, di-, tri- and tetra-$C_{1-8}$-alkylammonium heteropolychromates, -molybdates and -tungstates, alkali metal, earth alkaline metal, ammonium and mono-, di-, tri- and tetra-$C_{1-8}$-alkylammonium peroxo chromates, -molybdates and -tungstates, and hydroxyl containing chromates, molybdates and tungstates.

Examples of $C_{1-8}$-alkyl are methyl, ethyl, propyl, isopropyl, butyl, isobutyl, sec-butyl, tert-butyl, pentyl, hexyl, heptyl, octyl and 2-ethylhexyl.

Examples of chromium, molybdenum and tungsten oxides are chromium(III) oxide, chromium(VI) oxide, molybdenum(IV) oxide, molybdenum(VI) oxide, tungsten(IV) oxide and tungsten(VI) oxide.

Examples of alkali metal, earth alkaline metal, ammonium and mono-, di-, tri- and tetra-$C_{1-8}$-alkylammonium mono-, di- and polychromates, -molbydates and -tungstates are ammonium chromate, potassium chromate, magnesium chromate, ammonium dichromate, sodium dichromate, potassium dichromate, ammonium molybdate, sodium molybdate, potassium molybdate, magnesium molybdate, calcium molybdate, ammonium dimolybdate, ammonium heptamolybdate, ammonium octamolybdate, ammonium decamolybdate, ammonium tungstate, sodium tungstate, potassium tungstate, magnesium tungstate, calcium tungstate, ammonium metatungstate, sodium metatungstate and ammonium paratungstate.

Polychromates, molybdates and tungstates can also be called isopolychromates, -molybdates and -tungstates.

Examples of alkali metal, earth alkaline metal, ammonium and mono-, di-, tri- and tetra-$C_{1-8}$-alkylammonium heteropolychromates, -molybdates and -tungstates are $[Fe^{III}(Mo_6O_{24})]^{9-}$, $[Te^{VI}(Mo_6O_{24})]^{6-}$, $[I^{VII}(Mo_6O_{24})]^{5-}$, $[Cr^{III}(Mo_6O_{24}H_6)]^{3-}$, $[Mn^{IV}(Mo_9O_{32})]^{6-}$, $[Ni^{IV}(Mo_9O_{32})]^{6-}$, $[(P^V(Mo_{12}O_{40})]^{3-}$, $[(Si^{IV}(Mo_{12}O_{40})]^{4-}$, $[(S^{IV}(Mo_{12}O_{40})]^{4-}$, $[(Ce^{IV}(Mo_{12}O_{42})]^{8-}$, $[I(W_6O_{24})]^{5-}$, $[Te(W_6O_{24})]^{6-}$, $[P(W_{12}O_{40})]^{3-}$ and $[Si(W_{12}O_{40})]^{4-}$ having sodium, potassium, magnesium, calcium or ammonium or mixtures thereof as countercation.

Examples of hydroxyl containing chromates, molybdates and tungstates are chromium(III) hydroxide, chromium(II) hydroxide and hexahydroxymolybdate.

Oxygen-containing chromium, molybdenum or tungsten compounds are either commercially available or can be prepared by methods known in the art.

More preferably, the oxygen-containing transition metal compound is selected from the group consisting of alkali metal, earth alkaline metal, ammonium and mono-, di-, tri- and tetra-$C_{1-8}$-alkylammonium mono-, di- and polychromates, -molybdates and -tungstates.

Most preferably, the oxygen-containing transition metal compound is selected from the group consisting of alkali metal, ammonium and mono-, di-, tri- and tetra-$C_{1-8}$-alkylammonium mono-, di- and polymolybdates and -tungstates. Examples of alkali metal and ammonium mono-, di- and polymolybdates and -tungstates are ammonium molybdate, sodium molybdate, potassium molybdate, ammonium dimolybdate, ammonium heptamolybdate, ammonium octamolybdate, ammonium decamolybdate, ammonium tungstate, sodium tungstate, potassium tungstate, ammonium metatungstate, sodium metatungstate and ammonium paratungstate.

The aqueous solvent can be water or a mixture of water and a water-miscible organic solvent. Any suitable water-miscible organic solvent can be used. Examples of water-miscible organic solvents are $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethylacetamide, N-methylpyrolidone and sulfolane, whereby $C_{1-4}$-alkanols and $C_{2-4}$-polyols may be substituted with $C_{1-4}$-alkoxy. Examples of $C_{1-4}$-alkanols are methanol, ethanol, propanol, isopropanol or butanol, isobutanol, sec-butanol and tert-butanol. Examples of a $C_{1-4}$-alkoxyderivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile.

Preferably, the water-miscible organic solvent is selected from the group consisting of $C_{1-4}$-alkanols, $C_{2-4}$-polyols, $C_{3-6}$-ketones, dimethylformamide and dimethylacetamide, whereby $C_{1-4}$-alkanols and $C_{2-4}$-polyols may be substituted with $C_{1-4}$-alkoxy.

Preferably, the ratio of water/water-miscible organic solvent of the mixture of water and water-miscible organic solvent is at least 0.1/1, more preferably 0.5/1, and most preferably, at least 1/1.

Preferably, the aqueous solvent is water.

Energy can be heat or any other energy, which yields a marking when applied to the coating formed by the composition of the present invention. Examples of such energy are UV, IR, visible or microwave irradiation.

Preferably, the energy is IR irradiation. More preferably, the energy is IR irradiation having a wavelength in the range of 780 to 1,000,000 nm. Even more preferably, the energy is IR irradiation generated by a $CO_2$ laser or a Nd:YAG laser. Most preferably, the energy is IR irradiation generated by a $CO_2$ laser having a wavelength of 10,600 nm.

A transparent coating can be defined as a coating that has a transmittance of greater than 80%, preferably greater than 90%, of the visible wavelength. The transmittance can be determined by measuring the transmittance at a particular wavelength of the visible region using a UV/Vis spectrometer.

Preferably, the composition of the present invention also comprises an additive selected from the group consisting of organic acids, polyhydroxy compounds and bases.

The organic acids can be of formula $R^1$—COOH, wherein $R^1$ can be hydrogen, $C_{1-13}$-alkyl, $C_{2-11}$-alkenyl or aryl, whereby $C_{1-13}$-alkyl and $C_{2-11}$-alkenyl can be mono- or polysubstituted with hydroxyl, carboxy, $NHCOC_{1-4}$-alkyl and/or aryl, and aryl can be mono or polysubstituted with hydroxyl, halogen, $C_{1-4}$-alkyl, $C_{1-4}$-alkoxy, $di(C_{1-4}$-alkyl)amino and/or aryl.

Examples of aryl are phenyl and naphthyl. Examples of halogen are chlorine and bromine. Examples of $C_{1-4}$ alkyl are methyl, ethyl, propyl, isopropyl, butyl, sec-butyl, isobutyl and tert-butyl. Examples of $C_{1-4}$-alkoxy are methoxy, ethoxy, propoxy, isopropoxy, butoxy, sec-butoxy, isobutoxy and tert-butoxy.

Examples of organic acids of formula $R^1$—COOH, wherein $R^1$ is $C_{1-13}$-alkyl are acetic acid, propionic acid, butyric acid, valeric acid, hexanoic acid, heptanoic acid, octanoic acid, decanoic acid, lauric acid and myristic acid.

Examples of organic acids of formula $R^1$—COOH, wherein $R^1$ is $C_{1-13}$-alkyl, which is mono- or polysubstituted with hydroxyl, carboxy and/or aryl, whereby aryl is mono- or polysubstituted with $C_{1-4}$-alkyl, $C_{1-4}$-alkoxy and/or aryl, are lactic acid, malic acid, tartaric acid, citric acid, oxalic acid, succinic acid, phenyl acetic acid, p-tolylacetic acid, 4-biphenylacetic acid, 4-methoxyphenylacetic acid, 3,4-dimethoxyphenyl acetic acid, 1-naphthylacetic acid, hydrocinnamic acid, 3,4,5-trimethoxyhydrocinnamic acid, 4-phenylbutyric acid and mandelic acid.

Examples of organic acids of formula $R^1$—COOH, wherein $R^1$ is $C_{2-11}$-alkenyl are trans-2-pentenoic acid, trans-3-hexenoic acid, 2,4-hexadienoic acid, 2,6-hexadienoic acid, trans-2-octenoic acid and undecylenic acid.

Examples of organic acids of formula $R^1$—COOH, wherein $R^1$ is $C_{2-11}$-alkyl, which is mono- or polysubstituted with hydroxyl, carboxy, $NHCOC_{1-4}$-alkyl and/or aryl, whereby aryl is substituted with mono- or poly hydroxyl, halogen, $C_{1-4}$-alkyl and/or $C_{1-4}$-alkoxy, are ascorbic acid, fumaric acid, maleic acid, muconic acid, α-acetamidocinnamic acid, 4-methylcinnamic acid, ferulic acid, trans-cinnamic acid, trans-3,4-dimethoxycinnamic acid, trans-2-chloro-cinnamic acid, trans-3,4,5-trimethoxycinnamic acid and trans-styrylacetic acid.

Examples of organic acids of formula $R^1$—COOH, wherein $R^1$ is aryl are benzoic acid and 1-naphthoic acid. Examples of organic acids of formula $R^1$—COOH, wherein $R^1$ is aryl, which is mono or polysubstituted with hydroxyl, $C_{1-4}$-alkyl and/or $di(C_{1-4}$-alkyl)amino, are 3,5-di-tert-butylsalicylic acid, 4-(dimethylamino)benzoic acid, 3-hydroxy-2-naphthoic acid and 1-hydroxy-2-naphthoic acid.

It is also possible to use mixtures of organic acids.

Preferred organic acids are of formula $R^1$—COOH, wherein $R^1$ can be hydrogen, $C_{1-13}$-alkyl or $C_{2-11}$-alkenyl, whereby $C_{1-13}$-alkyl and $C_{2-11}$-alkenyl can be mono- or polysubstituted with hydroxyl, carboxy, $NHCOC_{1-4}$-alkyl and/or aryl, and aryl can be mono or polysubstituted with hydroxyl, $C_{1-4}$-alkyl, $C_{1-4}$-alkoxy and/or aryl.

Examples of preferred organic acids are formic acid, acetic acid, butyric acid, lauric acid, lactic acid, 2,6-hexadienoic acid, undecylenic acid, ascorbic acid, oxalic acid, succinic acid, malic acid, tartaric acid, citric acid, fumaric acid, muconic acid, phenyl acetic acid, p-tolylacetic acid, 4-biphenylacetic acid, 4-methoxyphenylacetic acid, mandelic acid, α-acetamidocinnamic acid, 4-methylcinnamic acid, ferulic acid, trans-cinnamic acid and trans-styrylacetic acid.

More preferred organic acids are selected from the group consisting of lauric acid, lactic acid, 2,6-hexadienoic acid, ascorbic acid, oxalic acid, succinic acid, malic acid, tartaric acid, citric acid, fumaric acid, muconic acid, phenyl acetic acid, mandelic acid, ferulic acid and trans-cinnamic acid.

Most preferred organic acids are tartaric acid or citric acid.

When the organic acid can exist as the D-enantiomer, the L-enantiomer or the racemate, all these three forms are comprised.

Preferred polyhydroxy compounds are selected from the group consisting of carbohydrates such as monosaccharides, disaccharides and polysaccharides, and derivatives thereof wherein the carbonyl group has been reduced to a hydroxyl group, so-called sugar alcohols.

Examples of monosaccharides are glucose, mannose, galactose, arabinose, fructose, ribose, erythrose and xylose. Examples of disaccharides are maltose, cellobiose, lactose and sucrose. Examples of polysaccharides are cellulose, starch, gum arabic, dextrin and cyclodextrin. Examples of sugar alcohols are meso-erythritol, sorbitol, mannitol and pentaerythritol.

More preferred polyhydroxy compounds are disaccharides, polysaccharides and sugar alcohols.

Most preferred polyhydroxycompounds are sucrose, gum arabic and meso-erythritol.

When a polyhydroxy compound can exist as the D-enantiomer, the L-enantiomer or the racemate, all these three forms are comprised.

The base can be selected from the group consisting of alkali metal, earth alkaline metal and ammonium hydroxides and carbonates and amines of the formula $(R^2R^3R^4)N$, wherein $R^2$, $R^3$ and $R^4$ can be the same or different and can be hydrogen, $C_{1-8}$-alkyl or aryl, or wherein $R^2$ can be hydrogen, $C_{1-8}$-alkyl or aryl and $R^3$ and $R^4$ can together with the nitrogen to which they are attached form a 5- or 6 membered cyclic ring, whereby $C_{1-8}$-alkyl and aryl may be mono- or polysubstituted with hydroxyl or amino.

Examples of alkali metal, earth alkaline metal or ammonium hydroxides and carbonates are sodium hydroxide, potassium hydroxide, magnesium hydroxide, calcium hydroxide, sodium carbonate, potassium carbonate, magnesium carbonate and calcium carbonate.

Examples of amines of the formula $(R^2R^3R^4)N$ are ammonia, triethylamine, di- and tributylamine, di- and tripentylamine, di- and trihexylamine, mono-, di- and triethanolamine, N,N-dimethylethanolamine, ethylenediamine, 1,2- and 1,3-diaminopropane, aniline, morpholine, piperidine, pyrazine and pyrrolidine.

Preferred bases are alkali metal, earth alkaline metal or ammonium hydroxide and amines of the formula $(R^2R^3R^4)N$, wherein $R^2$, $R^3$ and $R^4$ can be the same or different and can be hydrogen or $C_{1-8}$-alkyl, whereby $C_{1-8}$-alkyl may be mono- or polysubstituted with hydroxyl or amino.

More preferred bases are alkali metal or ammonium hydroxide and ammonia. Preferably, the molar ratio of base/oxygen-containing transition metal compound is at least 7:1, more preferably at least 9:1, most preferably, at least 18:1.

In one preferred embodiment of the composition of the present invention, the additive is an organic acid or a polyhydroxy compound. In this embodiment, the oxygen-containing transition metal compound is preferably selected from the group consisting of alkali metal and ammonium mono-, di- and polymolybdates and -tungstates and more preferably selected from the group consisting of alkali metal and ammonium mono- and dimolybdates and -tungstates such as ammonium molybdate, sodium molybdate, potassium molybdate, ammonium dimolybdate, ammonium tungstate, sodium tungstate and potassium tungstate. Particularly preferred are compositions wherein the oxygen-containing transition metal compound is ammonium dimolybdate and the additive is an organic acid, or wherein the oxygen-containing transition metal compound is an alkali metal monomolybdate or -tungstate such as sodium or potassium molybdate or tungstate and the additive is a polyhydroxy compound.

In another preferred embodiment of the composition of the present invention the additive is a base. In this embodiment, the oxygen-containing transition metal compound is preferably an alkali metal and ammonium mono-, di- and polymolybdate, more preferably it is ammonium octamolybdate.

Preferably, the composition of the present invention also comprises a water-soluble or water-dispersible polymeric binder.

Water-soluble means that at least 5 g of the polymeric binder is soluble in 100 g water at 25° C.

Any suitable water-soluble or water-dispersible polymeric binder can be used, for example acrylic polymers, styrene polymers, vinyl polymers and derivatives thereof, polyolefins, polyurethanes and natural polymers and derivatives thereof.

It is also possible to use mixtures of polymeric binders.

Acrylic polymers are polymers formed from at least one acrylic monomer or from at least one acrylic monomer and at least one other ethylenically unsaturated polymer such as a styrene monomer, vinyl monomer, olefin monomer or maleic monomer.

Examples of acrylic monomers are (meth)acrylic acid or salts thereof, (meth)acrylamide, (meth)acrylonitrile, $C_{1-6}$-alkyl (meth)acrylates such as ethyl (meth)acrylate, butyl (meth)acrylate or hexyl (meth)acrylate, 2-ethylhexyl (meth)acrylate, di($C_{1-6}$-alkylamino)-$C_{1-6}$-alkyl (meth)acrylates such as dimethylaminoethyl acrylate or diethylaminoethyl acrylate, amides formed from di($C_{1-4}$-alkylamino)$C_{1-6}$-alkylamines and (meth)acrylic acid.

Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluroethylene. Examples of maleic monomers are maleic acid, maleic anhydride and maleimide.

Examples of acrylic polymers are carboxylated acrylic copolymers as sold for example by Ciba under the tradenames Ciba® Glascol® LE15, LS20 and LS24, carboxylated styrene acrylic copolymers as sold for example by Ciba under the tradename Ciba® Glascol® LS26, styrene acrylic copolymers as sold for example by Ciba under the tradename Ciba® Glascol® C44, and polyacrylic acid polymers as sold for example by Ciba under the tradename Ciba® Glascol® E11.

Styrene polymers are polymers formed from at least one styrene monomer and at least one vinyl monomer, olefin monomer and/or maleic monomer. Examples of styrene polymers are styrene butadiene styrene block polymers, styrene ethylene butadiene block polymers, styrene ethylene propylene styrene block polymers and styrene-maleic anhydride copolymers.

Vinyl polymers are polymers formed from at least one vinyl monomer or from at least one vinyl monomer and at least one olefin monomer or maleic monomer. Examples of vinyl polymers are polyvinyl chloride, polyvinylalcohol, polyvinylacetate, partially hydrolysed polyvinyl acetate and methyl vinyl ether-maleic anhydride copolymers. Examples of derivatives thereof are carboxy-modified polyvinyl alcohol, acetoacetyl-modified polyvinyl alcohol, diacetone-modified polyvinyl alcohol and silicon-modified polyvinyl alcohol.

Polyolefins are polymers formed from at least one olefin monomer or from at least one olefin monomer or maleic monomer. Examples of polyolefines are polyethylene, polypropylene, polybutadiene and isopropylene-maleic anhydride copolymer Polyurethane are polymers formed from at least one diisocyanate monomer and at least one polyol monomer and/or polyamine monomer. Examples of diisocyanate monomers are hexamethylene diisocyanate, toluene diisiocyanate and diphenylmethane diiscocyanate.

Examples of natural polymers are starch, cellulose, gelatine, caesin and natural rubber. Examples of derivatives are oxidised starch, starch-vinyl acetate graft copolymers, hydroxyethyl cellulose, hydroxypropyl cellulose, methyl cellulose, ethyl cellulose, carboxymethyl cellulose and acetyl cellulose.

The polymeric binders are known in the art and can be produced by known methods, e.g. by polymerisation starting from suitable monomers.

Preferably, the polymeric binder is selected from the group consisting of acrylic polymers, styrene butadiene copolymers, styrene-maleic anhydride copolymers, polyvinyl alcohol, polyvinyl acetate, partially hydrolysed polyvinyl acetate, methyl vinyl ether-maleic anhydride copolymers, carboxy-modified polyvinyl alcohol, acetoacetyl-modified polyvinyl alcohol, diacetone-modified polyvinyl alcohol and silicon-modified polyvinyl alcohol, isopropylene-maleic anhydride copolymer, polyurethane, cellulose, gelatine, caesin, oxidised starch, starch-vinyl acetate graft copolymers, hydroxyethyl cellulose, methyl cellulose, ethyl cellulose, carboxymethyl cellulose and acetyl cellulose.

More preferably, the polymeric binder is an acrylic polymer.

Most preferably, the polymeric binder is an acrylic polymer as sold by Ciba under the tradename Ciba® Glascol® such as Ciba® Glascol® LE15, LS20, LS24, LS26, E11 and C44.

Preferably, the composition of the present invention can also comprise additional components.

The additional components that may be included in the coating composition can be any component suitable for improving the performance of the composition. Examples of additional components are IR absorbers, UV absorbers, pigments, colour formers, stabilizers, antioxidants and taggants, which are various substances added to a product to indicate its source of manufacture.

Examples of IR absorbers are alkylated triphenyl phosphorothionates, for example as sold under the trade name Ciba® Irgalube® 211. An example of a UV absorber is 2-hydroxy-4-methoxybenzophenone.

Pigments can be added for enhanced contrast between unimaged and imaged areas or as a security feature.

Examples of pigments which can be added for enhanced contrast between unimaged and imaged area are titanium dioxide, calcium carbonate, kaolin, calcined kaolin, aluminium hydroxide, talc, zinc oxide, amorphous silica, barium sulfate, polystyrene resin, urea-formaldehyde resin, hollow plastic pigment and mixtures thereof.

Examples of pigments which can be added as a security feature are fluorescent pigments or magnetic pigments.

Examples of colour formers are phthalides, fluorans, triarylmethanes, benzoxazines, quinazolines, spiropyrans, quinones, thiazines and oxazines or mixtures thereof.

Examples of phthalides are crystal violet lactone (3,3-bis(p-dimethylaminophenyl)-6-dimethyl-aminophtalide), 3,3-bis(1-ethyl-2-methylindol-3-yl)phthalide, 7-(N-ethyl-N-isopentylamino)-3-methyl-1-phenylspiro[4H-chromeno[2,3-c]pyrazole-4(1H)-3'phthalide, 3,3-bis-[2-(p-dimethylaminophenyl)-2-(p-methoxyphenyl)ethenyl-4,5,6,7-tetrabromophthalide and 3-(4-di-ethylamino-2-ethoxyphenyl)-3-(1-ethyl-2-methylindol-3-yl)-4-azaphthalide.

Examples of fluorans are 3-di(ethyl)amino-6-methyl-7-(tert-butoxycarbonyl)anilinofluoran, 3-diethylamino-7-dibenzylaminofluoran, 3-dibutylamino-7-dibenzylaminofluoran, 3-diethyl-amino-6-methyl-7-(dibenzylamino)fluoran, 3-diethylamino-6-methylfluoran, 3-diethylaminobenzo[a]fluoran, 3-dimethylamino-6-methyl-7-anilinofluoran, 3-diethylamino-6-methyl-7-(2-chloroanilino)fluoran, 3-diethylamino-6-ethoxyethyl-7-anilinofluoran, 3-pyrrolidino-6-methyl-7-anilinofluoran, 3-pi peridino-6-methyl-7-anilinofluoran, 3-(N-methyl-N-propyl-amino)-6-methyl-7-anilinofluoran, 3-(N-methyl-N-cyclohexylamino)-6-methyl-7-anilinofluoran, 3-(N-ethyl-p-toluidino)amino-6-methyl-7-anilinofluoran, 3-(N-ethyl-N-tetrahydrofurfurylamino)-6-methyl-7-anilinofluoran and 2-methyl-6-p-(p-dimethylaminophenyl)aminoanilinofluoran.

Examples of benzoxazines are 2-phenyl-4-(4-diethylaminophenyl)-4-(4-methoxyphenyl)-6-methyl-7-dimethylamino-3,1-benzoxazine, which can be prepared as described in EP 0 187 329 A1, and 2-phenyl-4-(4-diethylaminophenyl)-4-(4-methoxyphenyl)-8-methyl-7-dimethylamino-3,1-benzoxazine.

An example of a quinazoline is 4,4'-[1-methylethylidene)bis(4,1-phenyleneoxy-4,2-quina-zolinediyl)]bis[N,N-diethylbenzeneamine]. An example of a triarylmethane is bis(N-methyldi-phenylamine)-4-yl-(N-butylcarbazole)-3-ylmethane, which can be prepared as described in GB 1,548,059.

Examples of spiropyrans are 1',3',3'-trimethylspiro[2H-1-benzopyran-2,2'-indoline], 1,3,3-tri-methylspiro[indoline-2,3'-[3H]naphth[2,1-b][1,4]oxazine] and 1',3',3'-trimethylspiro-[2H-1-benzothiopyran-2,2'-indoline].

An example of a quinone is hematoxyline. An example of an oxazine is 3,7-bis(dimethyl-amino)-10-benzoylphenoxazine. An example of a thiazine is 3,7-bis(dimethylamino)-10-benzoylphenothiazine.

Preferably, the colour former is a phthalide or a fluoran or mixtures thereof.

Preferably, the optional other components do not include a water-insoluble IR absorber such as Baytron P and/or a colour former.

The coatings formed by the coating compositions of the present invention can be coated with a laminate layer or overprint varnish. If the material of the laminate layer or the overprint varnish is selected so that it does not absorb at the wavelength of the imaging laser then the laser sensitive coating can be imaged through the laminate layer without damaging or marking the laminate. Also the laminate or overprint varnish is ideally chosen that it does not result in colouration of the coating before the energy treatment.

The composition of the present invention can comprise 10 to 95%, preferably 10 to 90%, by weight of the aqueous solvent based on the weight of the total composition.

The composition of the present invention can comprise 10 to 50%, preferably 1 to 40%, more preferably 1 to 30% and most preferably 1 to 20%, by weight of oxygen-containing transition metal compound based on the weight of the total composition.

The composition of the present invention can comprise 10 to 50%, preferably 1 to 40%, more preferably 1 to 30% and most preferably 1 to 20%, by weight of the additive based on the weight of the total composition.

The composition of the present invention can comprise 10 to 80%, preferably 1 to 70%, more preferably 1 to 60% and most preferably 1 to 50%, by weight of the water-soluble or water-dispersible polymeric binder based on the weight of the total composition.

The composition of the present invention can comprise 0 to 30%, preferably 0 to 20%, more preferably 0 to 10% and most preferably 0%, by weight of additional components based on the weight of the total composition.

The composition of the present invention can consist of 10 to 95% by weight of an aqueous solvent, 1 to 50% by weight of an oxygen-containing transition metal compound, 1 to 50% by weight of an additive, 1 to 80% by weight of a water-soluble or water-dispersible polymeric binder and 0 to 30% by weight of additional components, all based on the weight of the total composition.

Preferably, the composition of the present invention consists of 10 to 95% by weight of an aqueous solvent, 1 to 40% by weight of an oxygen containing oxygen-containing transition metal compound, 1 to 40% by weight of an additive, 1 to 70% by weight of a water-soluble or water-dispersible polymeric binder, and 0 to 20% by weight of additional components, all based on the weight of the total composition.

More preferably, the composition of the present invention consists of 10 to 90% by weight of an aqueous solvent, 1 to 30% by weight of an oxygen-containing transition metal compound, 1 to 30% by weight of an additive, 1 to 60% by weight of a water-soluble or water-dispersible polymeric binder, and 0 to 10% by weight of additional components, all based on the weight of the total composition.

Most preferably, the composition of the present invention consists of 10 to 90% by weight of an aqueous, 1 to 20% by weight of an oxygen-containing transition metal compound, 1 to 20% by weight of an additive, 1 to 50% by weight of a water-soluble or water-dispersible polymeric binder, and 0% by weight of additional components, all based on the weight of the total composition.

Also part of the invention is a process for preparing the composition of the present invention which process comprises mixing an aqueous-based aqueous solvent with an oxygen-containing transition metal compound.

Preferably, the process comprises mixing an aqueous solvent with an oxygen-containing transition metal compound and an additive.

In one preferred embodiment, the process comprises mixing an aqueous solvent with an oxygen-containing transition metal compound, an additive and a water-soluble or water-dispersible polymeric binder. Additional components can be present.

In another preferred embodiment, the process comprises (i) mixing an aqueous solvent with an oxygen-containing transition metal compound and an additive and (ii) forming a water-soluble or water-dispersible polymeric binder by polymerization of suitable monomers in the presence of the mixture obtained in step (i). Additional components can be present in step (i) or added post polymerisation.

Also part of the invention is a substrate coated with the coating composition of the present invention.

The substrate can be a sheet or any other three dimensional object, it can be transparent or opaque and it can have an even or uneven surface. An example of a substrate having an uneven surface is a filled paper bag, such as a paper bag of cement. The substrate can be made from paper, cardboard, metal, wood, textiles, glass, ceramics and/or polymers. Examples of polymers are polyethylene terephthalate, low density-polyethylene, polypropylene, biaxially orientated polypropylene, polyether sulfone, polyvinyl chloride polyester and polystyrene. Preferably, the substrate is made from paper, cardboard or polymer.

The thickness of the coating usually chosen is in the range of 0.1 to 1000 μm. Preferably, it is in the range of 1 to 500 μm. More preferably, it is in the range of 1 to 200 μm. Most preferably, it is in the range of 1-20 μm.

Another aspect of the present invention is a process for preparing a coated substrate, which comprises the step of coating a substrate with the composition of the present invention.

The substrate can be coated with the composition of the present invention by using a standard coating application as such as a bar coater application, rotation application, spray application, curtain application, dip application, air application, knife application, blade application or roll application. The composition can also be applied to the substrate by various printing methods such as silk screen printing, gravure printing, offset printing and flexo printing. If the substrate is paper, the composition can also be applied in the size press or at the wet-end of the paper machine.

The coating composition can be dried, for example at ambient or elevated temperature. The elevated temperature is ideally chosen to avoid image formation before exposure to the energy.

Also part of the invention is a process for preparing a marked substrate, which comprises the steps of i) coating a substrate with the composition of the present invention, and ii) exposing those parts of the coated substrate, where a marking is intended, to energy in order to generate a marking.

Preferably, the marking is black.

The energy can be heat or any other energy, which yields a marking when applied to the substrate coated with the composition of the present invention. Examples of such energy are UV, IR, visible or microwave irradiation.

The energy can be applied to the coated substrate in any suitable way, for example heat can be applied by using a thermal printer, and UV, visible and IR irradiation can be applied by using a UV or IR laser. Examples of IR lasers are $CO_2$ lasers, Nd:YAG lasers and IR semiconductor lasers.

Preferably, the energy is IR irradiation. More preferably, the energy is IR irradiation having a wavelength in the range of 780 to 1,000,000 nm. Even more preferably, the energy is IR irradiation generated by a $CO_2$ laser or a Nd:YAG laser. Most preferably, the energy is IR irradiation generated by a $CO_2$ laser having a wavelength of 10,600 nm.

Typically the exact power of the IR laser and the line speed is determined by the application and chosen to be sufficient to generate the image, for example, when the wavelength of the IR laser is 10,600 nm and the diameter of the laser beam is 0.35 mm, the power is typically 0.5 to 4 W, and the line speed is typically 300 to 1,000 mm/s.

Yet another aspect of the invention is the marked substrate, which is obtained by above process.

The coating compositions of the present invention have the advantage that they are aqueous, so no or only minimal volatile organic chemicals are generated, that they yield transparent coatings, and that they yield black images of high contrast. In addition, the coating compositions do not yield colouration before exposure to energy and the formed markings are of high stability, especially light fastness.

EXAMPLES

Example 1

Sodium molybdate (3 g, 12.4 mmol) is dissolved in water (8.8 g) and the mixture is then treated with sucrose (3 g, 4.4 mmol) to give a colourless solution. Ciba® Glascol® C44, which is a self crosslinking aqueous emulsion based on styrene acrylic copolymer having a solid content of 42% by weight, and a viscosity at 25° C. (Brookfield 20 rpm) of 200 mPa×s, (5.2 g) is then added and stirring continued for 30 minutes. The coating formulation is then coated onto plain paper, coated paper and polyethylene terephthalate film to yield a transparent coating that is readily marked by IR laser irradiation using a $CO_2$ laser (wavelength: 10'600 nm, power: 0.5 to 4 W, diameter of laser beam: 0.35 mm, line speed 300 to 1,000 mm/s) to yield a black marking.

Example 2

Sodium tungstate (3 g, 9.1 mmol) and sucrose (3 g, 8.8 mmol) is added to water (8.5 g), the mixture is stirred for 10 minutes to produce a colourless solution. Ciba® Glascol® LS26, which is an aqueous microemulsion of a carboxylated styrene acrylic copolymer having a solid content of 46% by weight, a pH of 8.5 and a viscosity at 25° C. (Brookfield 20 rpm) of 700 mPa×s, (9.5 g) is added, the mixture is stirred forming a white emulsion. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 3

Sodium tungstate (4 g, 12.1 mmol) and sucrose (4 g, 11.7 mol) is added to water (6.5 g), the mixture is stirred for 10 minutes to produce a colourless solution. Ciba® Glascol® LS26, which is an aqueous microemulsion of a carboxylated styrene acrylic copolymer having a solid content of 46% by weight, a pH of 8.5 and a viscosity at 25° C. (Brookfield 20 rpm) of 700 mPa×s, (9.5 g) is added, the mixture is stirred forming a white emulsion. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 4

Sodium tungstate (3 g, 9.1 mol) and meso-erythritol (3 g, 24.6 mol) is added to water (8.5 g), the mixture is stirred for 10 minutes to produce a colourless solution. Ciba® Glascol® LS26, which is an aqueous microemulsion of a carboxylated styrene acrylic copolymer having a solid content of 46% by weight, a pH of 8.5 and a viscosity at 25° C. (Brookfield 20 rpm) of 700 mPa×s, (9.5 g) is added, the mixture is stirred forming a white emulsion. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 5

Sodium tungstate (3 g, 9.1 mol) and gum arabic (3 g) is added to water (8.5 g), the mixture is stirred for 10 minutes to produce a pale brown suspension. Ciba® Glascol® LS26, which is an aqueous microemulsion of a carboxylated styrene acrylic copolymer having a solid content of 46% by weight, a pH of 8.5 and a viscosity at 25° C. (Brookfield 20 rpm) of 700 mPa×s, (9.5 g) is added, the mixture is stirred forming a pale brown suspension. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 6

Sodium molybdate (3 g, 12.4 mmol) and sucrose (3 g, 8.8 mmol) is added to a solution of Ciba® Glascol® LE15, which is a an aqueous emulsion of a carboxylated acrylic copolymer having a solid content of 60% by weight, a pH of 3 to 4 and a viscosity at 20° C. (Brookfield 20 rpm) of 200 mPa×s, (11 g). The mixture is then stirred for 10 minutes to produce a coating emulsion. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 7

Ammonium dimolybdate (1 g, 2.95 mmol) is dissolved in water (10 g), D,L-tartaric acid (0.5 g, 3.33 mmol) is added and the mixture is stirred to produce a colourless solution. Polyvinyl alcohol ($M_w$~47,000) (1 g) is then added and stirring continued for about further 30 minutes. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 8

Ammonium dimolybdate (1 g, 2.95 mmol) is dissolved in water (10 g), citric acid (0.5 g, 2.38 mmol) is added and the mixture is stirred to produce a colourless solution. Ciba® Glascol® E11, which is a polyacrylic acid based solution having a pH of 2 to 2.5 and a viscosity at 25° C. (Brookfield 20 rpm) of 2000 to 4000 mPa×s, (1 g) is then added and stirring continued for a further 30 minutes. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 9

Ammonium dimolybdate (1 g, 2.95 mmol) is dissolved in water (10 g), sucrose (0.5 g, 1.46 mmol) is added and the mixture is stirred to produce a colourless solution. Ciba® Glascol® E11, which is a polyacrylic acid based solution having a pH of 2 to 2.5 and a viscosity at 25° C. (Brookfield 20 rpm) of 2,000 to 4,000 mPa×s, (1 g) is then added and stirring continued for a further 30 minutes. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 10

Sodium molybdate (1 g, 4.13 mmol) is dissolved in water (4.5 g), D,L-tartaric acid (0.5 g, 3.33 mmol) is added and the mixture is stirred to produce a colourless solution. Ciba® Glascol® C44, which is a self crosslinking aqueous emulsion based on styrene acrylic copolymer having a solid content of 42% by weight, and a viscosity at 25° C. (Brookfield 20 rpm) of 200 mPa×s, (0.5 g) is then added and stirring continued for a further 30 minutes. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 11

Ammonium octamolybdate (3 g, 2.39 mmol) is added to a mixture of water (10 g) and 25% (w/w) aqueous ammonia solution (1.5 g, 22.0 mmol), the mixture is stirred for 45 minutes to produce a colourless solution. Ciba® Glascol® LS26, which is an aqueous microemulsion of a carboxylated styrene acrylic copolymer having a solid content of 46% by weight, a pH of 8.5 and a viscosity at 25° C. (Brookfield 20 rpm) of 700 mPa×s, (9.5 g) is added. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 12

Ammonium octamolybdate (6 g, 4.78 mmol) is added to a mixture of water (12 g) and N,N-dimethylethanolamine (4.5 g, 50.5 mmol), the mixture is stirred for 45 minutes to produce a colourless solution. Water (4.9 g) and Ciba® Glascol® LS26, which is an aqueous microemulsion of a carboxylated styrene acrylic copolymer having a solid content of 46% by weight, a pH of 8.5 and a viscosity at 25° C. (Brookfield 20 rpm) of 700 mPa×s, (44.6 g) is then added. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 13

Ammonium octamolybdate (3 g, 2.39 mmol) is added to a mixture of water (7 g) and 25% (w/w) aqueous ammonia solution (3 g, 44.0 mmol), the mixture is stirred for 45 minutes to produce a colourless solution. A mixture of Ciba® Glascol® LS24, which is an aqueous microemulsion of a carboxylated acrylic copolymer having a solid content of 48% by weight, a pH of 9.0 and a viscosity at 25° C. (Brookfield 20 rpm) of 1000 mPa×s, and Ciba® Glascol® C44, which is a self crosslinking aqueous emulsion based on styrene acrylic copolymer having a solid content of 42% by weight, and a viscosity at 25° C. (Brookfield 20 rpm) of 200 mPa×s, (2:1 ratio) (50 g) is then added. The coating formulation is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 14

Ammonium octamolybdate (3 g, 2.39 mmol) is added to water (7 g) and 25% (w/w) aqueous ammonia solution (3 g, 44 mmol), the mixture is stirred for 45 minutes to produce a colourless solution. A mixture of Ciba® Glascol® LS20, which is an aqueous microemulsion of a carboxylated acrylic copolymer having a solid content of 46% by weight, a pH of 8.5 and a viscosity at 25° C. (Brookfield 20 rpm) of 700 mPa×s, and Ciba® Glascol® C44, which is a self crosslinking aqueous emulsion based on styrene acrylic copolymer having a solid content of 42% by weight, and a viscosity at 25° C. (Brookfield 20 rpm) of 200 mPa×s, (2:1 ratio) (50 g) is then added. The coating formulation is then coated onto plain paper, coated paper and polyethylene terephthalate film to yield a transparent coating that is readily marked by IR laser irradiation using a $CO_2$ laser (wavelength: 10600 nm, power: 0.5 to 4 W, diameter of laser beam: 0.35 mm, line speed 300 to 1000 mm/s) to yield a black marking.

Example 15

SMA® 1000 sold by Elf Atochem, which is an aqueous styrene maleic anhydride copolymer, ammonium salt, having a molecular weight of 1,000 g/mol, a solid content of 29.8% and a pH of 9.0, (59.05 g) and water (3.55 g) are charged to a vessel and heated to 85° C. 3% (w/w) aqeous ammonium persufate solution (2.75 g) is then added. The monomers, styrene (14.52 g) and 2-ethylhexylacrylate (11.88 g), and the initiator, 3% (w/w) aqeous ammonium persulfate solution (8.25 g), are added over a period of 3 and 3.5 hours, respectively. The reaction is then held for a further hour at 85° C. to complete polymerisation. The reaction mixture is cooled to 40° C. adding Acticide® LG, which is a biocide containing as active ingredients 2-methyl-3(2H)-isothiazolone and 5-chloro-2-methyl-3(2H)-isothiazolone, and filtered through a 63 μm screen. The obtained dispersion polymer is then added to a mechanical mixer. Water (2.20 g), followed by 35% (w/w) aqueous ammonia solution (7.0 g, 144 mmol) are added into the vortex created by the mechanical mixer. Ammonium octamolybdate (10.0 g, 7.9 mmol) is then added gradually and mixing is continued for 30 minutes to ensure a homogeneous mixture. The obtained coating composition has a solid content of 45% by weight, a pH of 9.0 and a viscosity at 25° C. (Brookfield 20 rpm) of 250 mPa×s. The coating composition is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

Example 16

SMA® 1000 sold by Elf Atochem, which is an aqueous styrene maleic anhydride copolymer, ammonium salt, having a molecular weight of 1,000 g/mol, a solid content of 29.8% by weight and a pH of 9.0, (46.98 g), water (9.17 g), ammonium octamolybdate (10.0 g, 7.9 mmol) and 35% (w/w) aqeous ammonia solution (7.0 g, 144 mmol) are charged to a vessel and heated to 85° C. 3% (w/w) aqueous ammonium persulphate solution (1.35 g) is then added. The monomers, styrene (11.55 g) and 2-ethylhexylacrylate (9.45 g), and the initiator, 3% (w/w) aqueous ammonium persulphate solution (4.05 g), are added over a period of 3 and 3.5 hrs respectively. The reaction mixture is then held for a further hour at 85° C. to complete polymerisation. The reaction mixture is cooled to 40° C. adding Acticide® LG, which is a biocide containing as active ingredients 2-methyl-3(2H)-isothiazolone and 5-chloro-2-methyl-3(2H)-isothiazolone, and filtered through a 63 μm screen to yield a coating composition having a solid content of 45% by weight (21% by weight styrene 2-ethylhexylacrylate copolymer (55:45 (w/w)), 14% by weight SMA® 1000, 10% by weight ammonium octamolybdate), a pH of 9.0 and a viscosity at 25° C. (Brookfield 20 rpm) of 50 mPa×s. The coating composition is then coated onto plain paper, coated paper and polyethylene terephthalate film to yield a transparent coating that is readily marked by IR laser irradiation using a $CO_2$ laser (wavelength: 10,600 nm, power: 0.5 to 4 W, diameter of laser beam: 0.35 mm, line speed 300 to 1,000 mm/s) to yield a black marking.

The invention claimed is:
1. A composition comprising
an oxygen-containing transition metal compound, a base, and
an aqueous solvent,
wherein the base is at least one of
an alkali metal hydroxide,
an alkali metal carbonate,
an alkaline earth metal hydroxide,
an alkaline earth metal carbonate,
an ammonium hydroxide,
an ammonium carbonate, or
an amine of the formula $(R^2R^3R^4)N$,
wherein $R^2$, $R^3$ and $R^4$ are the same or different, and
wherein $R^2$, $R^3$ and $R^4$ are independently hydrogen, $C_{1-8}$-alkyl or aryl, or
wherein $R^2$ can be hydrogen, $C_{1-8}$-alkyl or aryl and $R^3$ and $R^4$ can together with the nitrogen to which they are attached form a 5- or 6-membered cyclic ring, wherein $C_{1-8}$-alkyl and aryl may be mono- or polysubstituted with hydroxyl or amino,
wherein the oxygen-containing transition metal compound is at least one of an oxygen-containing chromium, molybdenum or tungsten compound, and
wherein the composition is colorless and can form a transparent colorless coating, which can yield markings of high contrast on exposure to energy, and
wherein a transparent coating is defined as a coating that has a transmittance of greater than 80% of the visible wavelength, and
wherein the composition comprises 10 to 50% by weight of the base based on the weight of the total composition.

2. The composition of claim 1, wherein the oxygen-containing transition metal compound is at least one of an alkali metal, alkaline earth metal, ammonium or mono-, di-, tri- or tetra-$C_{1-8}$-alkylammonium mono-, di- or polychromate, -molybdate or -tungstate.

3. The composition of claim 2, wherein the oxygen-containing transition metal compound is at least one of an alkali metal, ammonium or mono-, di-, tri- or tetra-$C_{1-8}$-alkyl-ammonium mono-, di- or polymolybdate or -tungstate.

4. The composition of claim 1, wherein the oxygen-containing transition metal compound is ammonium octamolybdate.

5. The composition of claim 1, wherein the molar ratio of base/oxygen-containing transition metal compound is at least 7:1.

6. The composition of claim 1, further comprising a water-soluble or water-dispersible polymeric binder.

7. The composition of claim 6 comprising 10 to 80% by weight of the water-soluble or water-dispersible polymeric binder based on the weight of the total composition.

8. The composition of claim 1 comprising 10 to 95% by weight of the aqueous solvent based on the weight of the total composition.

9. The composition of claim 1 comprising 10 to 50% by weight of the oxygen-containing transition metal compound based on the weight of the total composition.

10. The composition of claim 1, wherein the base is ammonia.

11. The composition of claim 1, wherein the base is mono-, di- or triethanolamine or dimethylethanolamine.

12. A process for preparing the composition of claim 1 comprising mixing the aqueous solvent with the oxygen containing transition metal compound and the base,
wherein the base is at least one of
an alkali metal hydroxide,
an alkali metal carbonate,
an alkaline earth metal hydroxide,
an alkaline earth metal carbonate,
an ammonium hydroxide,
an ammonium carbonate, or
an amine of the formula $(R^2R^3R^4)N$,
wherein $R^2$, $R^3$, and $R^4$ are the same or different, and
wherein $R^2$, $R^3$, and $R^4$ are independently hydrogen, $C_{1-8}$-alkyl or aryl, or
wherein $R^2$ can be hydrogen, $C_{1-8}$-alkyl or aryl and $R^3$ and $R^4$ can together with the nitrogen to which they are attached form a 5- or 6-membered cyclic ring, and
wherein the $C_{1-8}$-alkyl and aryl may be mono- or polysubstituted with hydroxyl or amino,
wherein the oxygen-containing transition metal compound is at least one of an oxygen-containing chromium, molybdenum or tungsten compound, and
wherein the composition comprises 10 to 50% by weight of the base based on the weight of the total composition.

13. A substrate coated with the composition of claim 1.

14. A process for preparing a coated substrate comprising coating a substrate with the composition of claim 1.

15. A process for preparing a marked substrate comprising the steps of i) coating a substrate with the composition of claim 1, and ii) exposing those parts of the coated substrate, where a marking is intended, to energy in order to generate a marking.

16. The process of claim 15, wherein the energy is heat or UV, IR, visible or microwave irradiation.

17. A marked substrate obtainable by the process of claim 15.

* * * * *

UNITED STATES PATENT AND TRADEMARK OFFICE
CERTIFICATE OF CORRECTION

PATENT NO. : 8,642,504 B2  
APPLICATION NO. : 11/989167  
DATED : February 4, 2014  
INVENTOR(S) : Campbell et al.

Page 1 of 1

It is certified that error appears in the above-identified patent and that said Letters Patent is hereby corrected as shown below:

Title Page, Item (73) Assignee:
Replace "Gill Jennings & Every LLP, London (GB)" with "Datalase Ltd., Cheshire (UK)"

Signed and Sealed this
Sixth Day of May, 2014

Michelle K. Lee
*Deputy Director of the United States Patent and Trademark Office*